United States Patent
Bakhshaie

(10) Patent No.: US 12,417,252 B1
(45) Date of Patent: Sep. 16, 2025

(54) CONCEPT MAP TRANSLATION FOR URL PROFILES

(71) Applicant: INUVO, INC., Little Rock, AR (US)

(72) Inventor: Amir Bakhshaie, Little Rock, AR (US)

(*) Notice: Subject to any disclaimer, the term of this patent is extended or adjusted under 35 U.S.C. 154(b) by 0 days.

(21) Appl. No.: 17/947,865

(22) Filed: Sep. 19, 2022

(51) Int. Cl.
*G06F 16/955* (2019.01)
*G06F 16/951* (2019.01)

(52) U.S. Cl.
CPC .......... *G06F 16/955* (2019.01); *G06F 16/951* (2019.01)

(58) Field of Classification Search
CPC .............................. G06F 16/955; G06F 16/951
See application file for complete search history.

(56) References Cited

U.S. PATENT DOCUMENTS

| | | | |
|---|---|---|---|
| 9,947,029 B2* | 4/2018 | Collet et al. .......... | G06Q 30/02 |
| 11,087,364 B1* | 8/2021 | Chinavanichkit .. | G06Q 30/0275 |
| 11,195,209 B2* | 12/2021 | Hassan et al. ..... | G06Q 30/0275 |
| 2009/0281900 A1* | 11/2009 | Rezaei ............... | G06Q 30/0257 |
| | | | 707/999.005 |
| 2017/0345227 A1* | 11/2017 | Allen, Jr. .............. | G06F 16/951 |
| 2019/0287138 A1* | 9/2019 | Buchalter .......... | G06Q 30/0275 |
| 2020/0050707 A1* | 2/2020 | Tsykynovskyy .... | G06F 16/3347 |
| 2020/0193389 A1* | 6/2020 | Lagares-Greenblatt ..................... |  |
| | | | G06Q 10/063114 |
| 2020/0193510 A1* | 6/2020 | Zolfo ..................... | G06F 3/0346 |
| 2021/0200943 A1* | 7/2021 | Aviyam ................ | G06F 16/953 |
| 2022/0237665 A1* | 7/2022 | Chen ...................... | G06Q 40/04 |

* cited by examiner

*Primary Examiner* — Neveen Abel Jalil
(74) *Attorney, Agent, or Firm* — ACKnowledge IP P.C.; Paul Ackerman

(57) ABSTRACT

An example operation may include one or more of storing target profiles comprising respective target content, receiving a request comprising a uniform resource locator (URL) of web content being viewed on a user device, identifying a URL profile corresponding to the URL, wherein the URL profile comprises concepts associated with the web content, mapping the concepts included in the identified URL profile to a target profile among the stored target profiles via a concept map, and transmitting viewing content associated with the target profile to the user device in response to the received request.

17 Claims, 9 Drawing Sheets

250

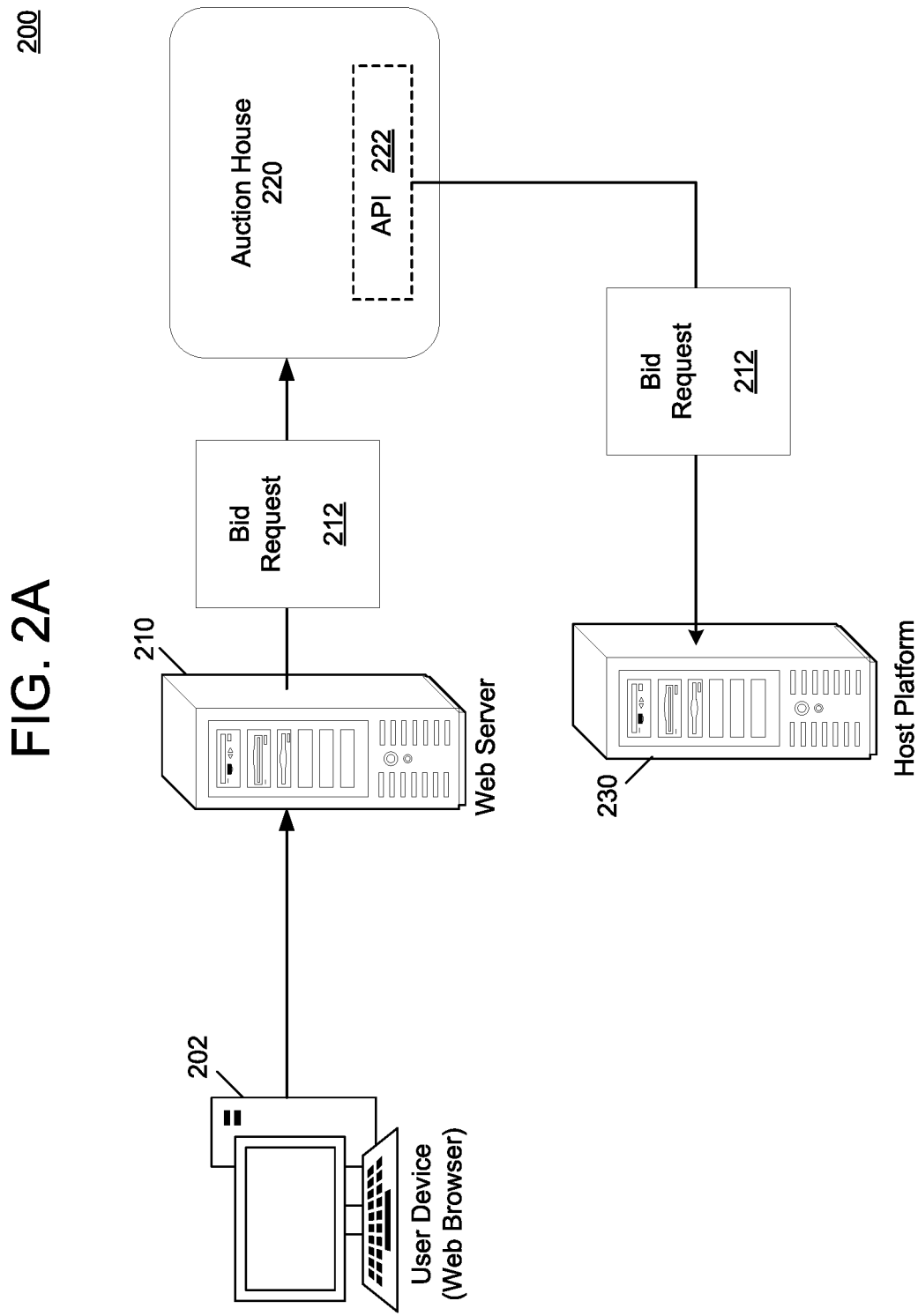

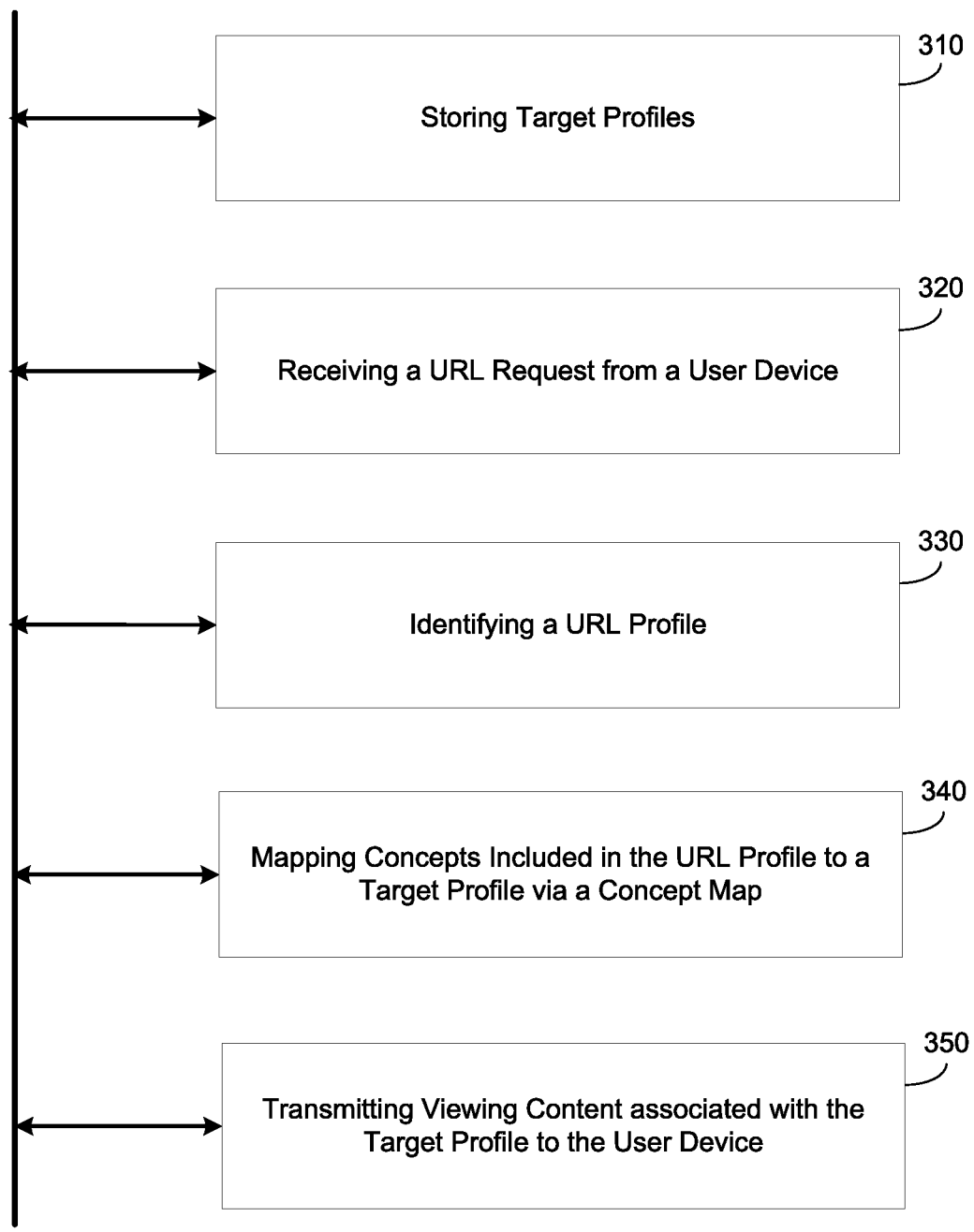

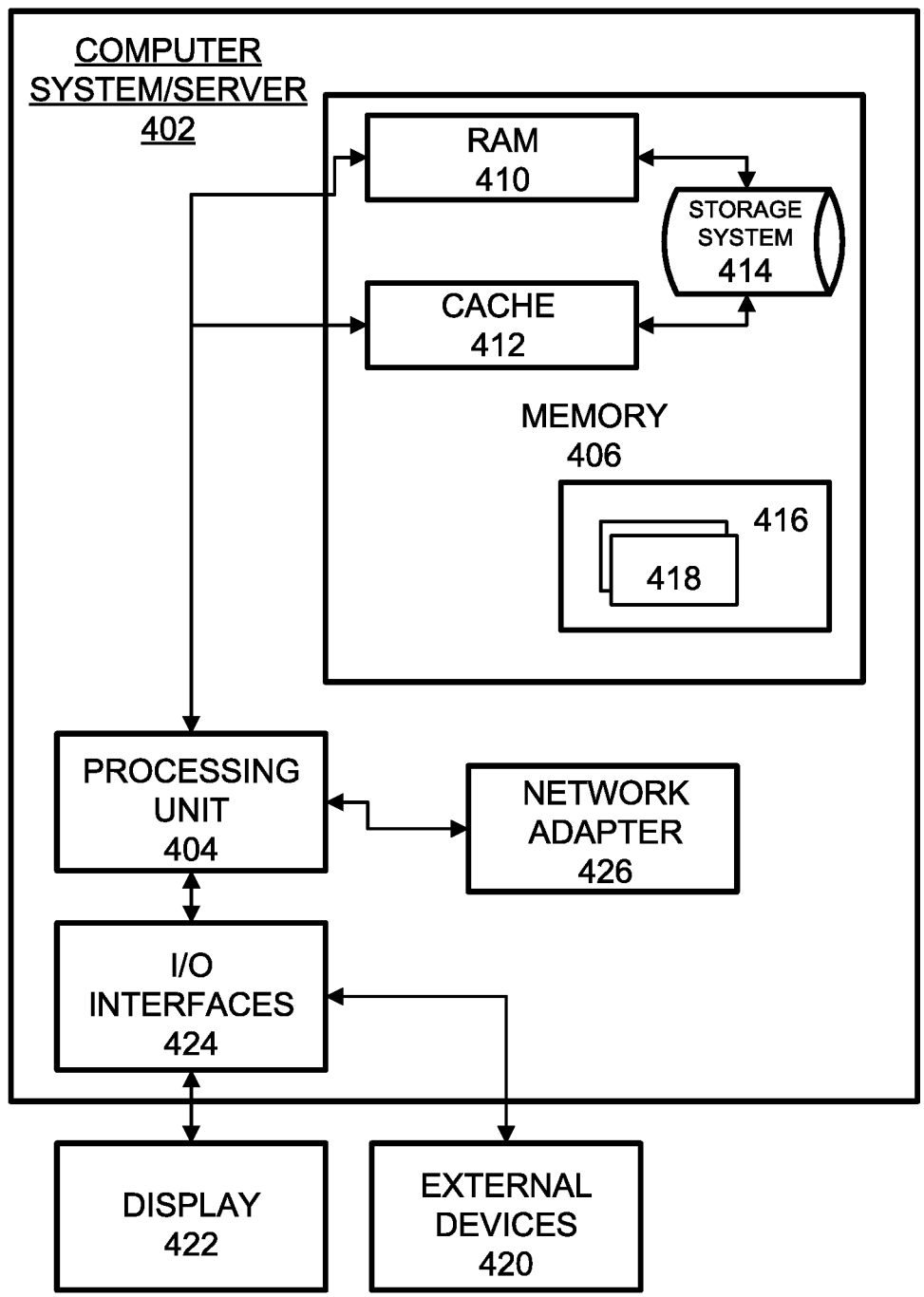
400  FIG. 4

CONCEPT MAP TRANSLATION FOR URL PROFILES

BACKGROUND

Many online activities are unstructured and when aggregated, comprises of billions of atomic or elementary actions. Online activities of users may include votes or likes for articles, posts, or other users' posts and activities, searches via search engines and individual sites, opening and viewing articles and web pages browsed, submitting posts on social media and networking sites, and other interactions made among friends on such sites. Many of these activities are unstructured. For example, not all friends are created equal, and one shares different types of information and activities with different sets of friends and colleagues. Such preferences are not explicitly expressed and defined, but instead must be inferred from other sources such as the content of the posts shared and liked, and the locations visited which can evolve over time.

One computationally challenging problem is how to make sense of individual users, and of groups of users collectively, from the billions of such seemingly diverse elementary actions and the available data. Traditionally, this process is performed using cookies that are pulled from a web browser, or the like. The cookies provide information about a particular user that is tracked over time including sites, pages, content, etc. visited by the user on the web. However, building a cookies file for tens of millions of users requires a significant amount of time and effort to continually track the user activities on a day-to-day basis. Accordingly, what is needed is a new way to understand users based on the content that they view.

SUMMARY

One example embodiment provides an apparatus that includes at least one of a storage configured to store target profiles comprising respective target content, a network interface configured to receive a request comprising a uniform resource locator (URL) of web content being viewed on a user device, and a processor configured to one or more of identify a URL profile corresponding to the URL, wherein the URL profile comprises concepts associated with the web content, map the concepts included in the identified URL profile to a target profile among the stored target profiles via a concept map, and transmit, via the network interface, viewing content associated with the target profile to the user device in response to the received request.

Another example embodiment provides a method that includes one or more of storing, via a storage device, target profiles comprising respective target content, receiving, via a network interface, a request comprising a uniform resource locator (URL) of web content being viewed on a user device, identifying, via a processor, a URL profile corresponding to the URL, wherein the URL profile comprises concepts associated with the web content, mapping, via the processor, the concepts included in the identified URL profile to a target profile among the stored target profiles via a concept map, and transmitting, via the network interface, viewing content associated with the target profile to the user device in response to the received request.

A further example embodiment provides a computer-readable medium comprising instructions, that when read by a processor, cause the processor to perform one or more of storing, via a storage device, target profiles comprising respective target content, receiving, via a network interface, a request comprising a uniform resource locator (URL) of web content being viewed on a user device, identifying, via a processor, a URL profile corresponding to the URL, wherein the URL profile comprises concepts associated with the web content, mapping, via the processor, the concepts included in the identified URL profile to a target profile among the stored target profiles via a concept map, and transmitting, via the network interface, viewing content associated with the target profile to the user device in response to the received request.

BRIEF DESCRIPTION OF THE DRAWINGS

FIG. 2A is a diagram illustrating a process of listening for bid requests at an auction house according to an example embodiment.

FIG. 3 is a diagram illustrating a method of translating a bid request into a target profile based on a URL profile according to an example embodiment.

FIG. 4 is a diagram illustrating an example of a computing system that supports one or more of the example embodiments.

DETAILED DESCRIPTION

Figure 1A:
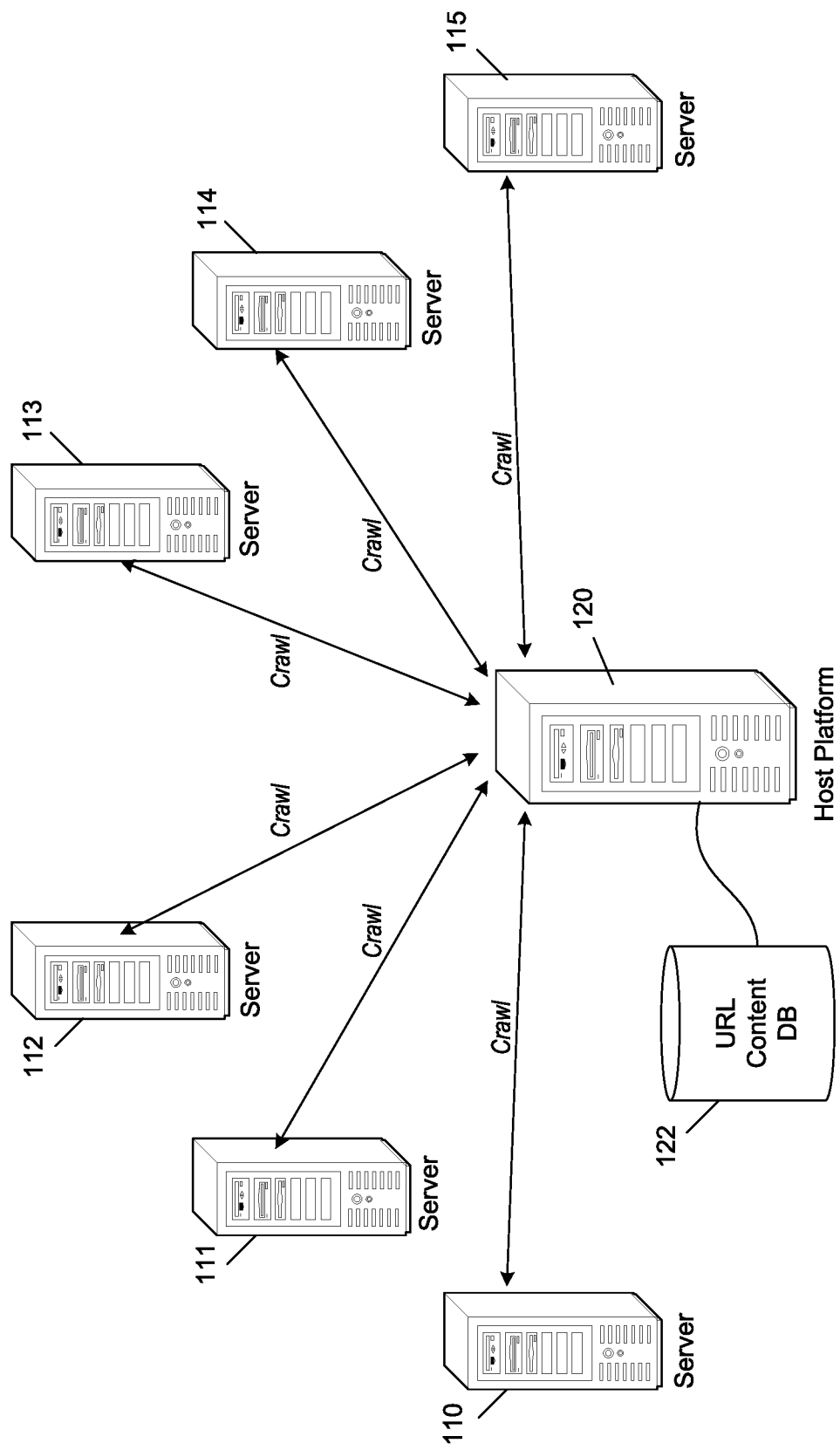
FIGS. 1A-1B are diagrams illustrating a process of building a concept map according to an example embodiment.

It is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

When a user opens a web page via a web browser, or the like, their device may capture what is commonly referred to as a bid request. The bid request may include information pulled from the user's device such as a cookie ID of the user (e.g., an advertising ID, etc.) which is uniquely tied to that user. In response, the user device may transmit the bid request to a server of the website which forward the bid request to an auction house. Participants of the auction house, such as advertisers, marketers, merchants, etc. may listen to bid requests, for example, via an application programming interface (API) of the auction house, or the like, and bid on bid requests that are sent to the auction house. The auction house selects the winning bid and then allows the bidder to transmit viewing content (e.g., advertising content, etc.) to the user device.

However, one of the drawbacks with this process is that the host platform, in this case the bidder at the auction house, must develop cookies profiles of each of the users thereby enabling them to understand who is behind the "cookie ID" in the bid request. Cookies take time to acquire and must be individually tracked for each device/user. This causes significant overhead in the processing of the bid requests as well.

In the example embodiments, a bid request can be processed without a cookie ID, and without accessing cookies. Instead, a machine learning process (e.g., a concept map, etc.) can be used to translate an identifier within the bid request (e.g., a URL, username, Floc ID, etc.) into a target profile (advertiser). The concept map can map target profiles (e.g., advertisers, etc.) to various subsets of nodes within the concept map. The host can use keywords and data from a page of the URL and map them to predefined nodes in the concept map. In addition, the host may use The predefined nodes may correspond to one or more target profiles (advertisers). In doing so, the concept map can be used to map a URL (or other identifier) to a target profile, without the need to use cookies or a cookie ID. Thus, the process can be performed in real-time without tracking historical/cookie data of a user.

In the examples described herein, a concept map (also referred to herein as a concept graph) includes a graphical model with many nodes (e.g., millions, billions, etc.) representing pages of content from the Internet. Examples of generating and using a concept map are described in U.S. Pat. No. 8,825,657, issued on Sep. 2, 2014, further described in U.S. Pat. No. 10,387,892, issued on Aug. 20, 2019, and further described in U.S. Pat. No. 10,311,085, issued on Jun. 4, 2019, the entire disclosures of which are each hereby incorporated by reference for all purposes.

For example, the concept map may include nodes corresponding to pages/concepts and edges between the nodes which identify relationships among the pages (e.g., a similarity between the concepts, etc.) The nodes may represent a page or multiple similar pages with related content. The nodes may be grouped together in the concept map based on their relatedness. For example, ten web pages associated with a similar subject matter (e.g., barbeque brisket recipes, etc.), may be grouped together in the concept map. In some cases, the nodes in the concept map may be arranged into neighborhoods of nodes where each neighborhood corresponds to a different category of subject matter and the edges between the nodes in the neighborhood may be annotated with information about the relationships between the nodes in the same neighborhood and nodes in other neighborhoods within the concept map.

FIG. 1A illustrates a process 100 of crawling websites for page content to build a concept map according to an example embodiment. Referring to FIG. 1A, a host platform 120 such as a cloud platform, a web server, a database, a combination of systems, and the like, may execute a crawl operation on a periodic basis/frequency (e.g., every 24 hours, etc.) and obtain page content from websites available on the Internet. The page content may include an identifier of the page (e.g., a URL, etc.) and attributes about the page including a subject matter, keywords, images, user reviews, and the like. For example, in FIG. 1A, the host platform crawls a plurality of servers 110-115 for page content from respective web pages/websites hosted by the plurality of servers 110-115. The crawl process may be performed on millions of sites on a periodic basis requiring significant processing power (e.g., multiple servers, etc.) The crawled content from the web pages/websites may be stored within a URL content database 122.

As an example, the host platform may execute a web crawler that includes an Internet bot that is capable of systematically browsing the World Wide Web, downloading pages that are browsed, and indexing the pages with information that can be used to build the concept map such as one or more subject matters associated with the content on the pages, one or more keywords within the content, and the like. The web crawler may start with a list of URLs, or pages, that are referred to as seeds. As the crawler visits the URLs, by communicating with web servers that respond to those URLs, the crawler is able to identify hyperlinks in the retrieved web pages and adds them to the list of URLs to visit. As such, URLs are recursively visited according to a set of policies. The crawler may also archive content from the websites (or web archiving) and store the archived content in the URL content database 122. The pages can be stored in such a way they can be viewed, read and navigated as if they were on the live web, but are preserved as snapshots instead of live access to the website.

Figure 1B:
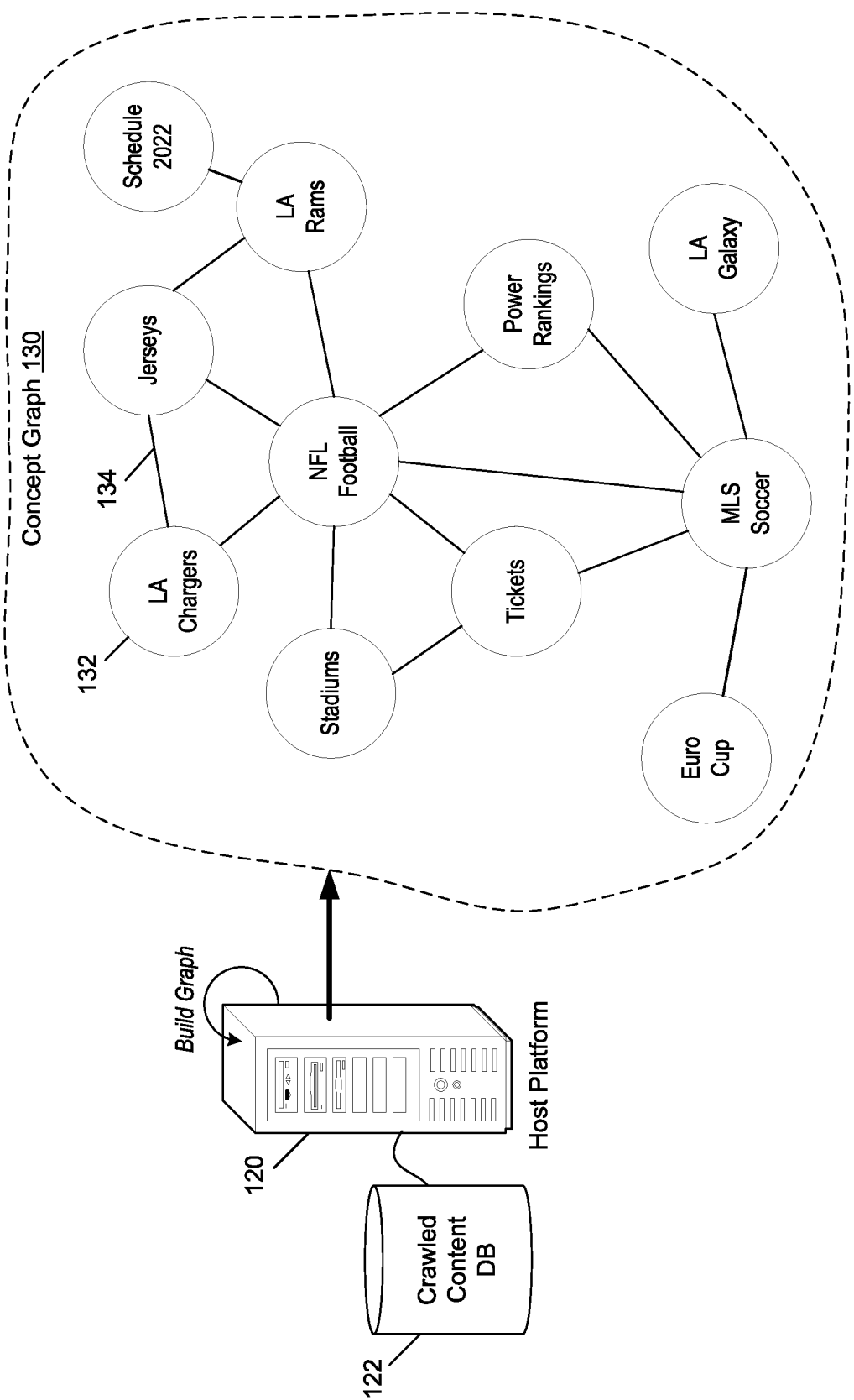

FIG. 1B illustrates a process 140 of building a concept map 130 based on the crawled content stored in the URL content database 122 via the process 100 shown in FIG. 1A. Referring to FIG. 1B, the host platform 120 may generate the concept map 130 which may be depicted as a graph, or graph model, where each node 132 of the graph represents a concept, and where each bidirectional multi edge 134 between a pair of nodes represents a relationship between the respective concepts. These relationships may include, for example, page co-occurrence (frequency of the concepts occurring on the same page) or functional relationships as extracted from the World Wide Web, click through rates (CTRs) of advertisement, co-occurrence in advertiser campaigns (frequency of the concepts occurring in the same advertiser campaign), co-occurrence in advertisement creatives (frequency of the concepts occurring in the same advertisement creative), taxonomies and manually generated maps, user behavior such as query log funnels (queries submitted within a sequentially short period), and the like.

In the concept map 130, both nodes 132 and edges 134 of the concept map 130 can have different attributes, and the edges 134 (relationships) can be bidirectional. Examples of node attributes include frequency on the Web, frequency on a particular corpus of documents, structural rank calculated on the graph itself, cost per click (CPC) and CTR information of corresponding advertisement listings, and the like. Examples of different edge types and attributes include clickthrough rate of advertisement, user query rewrite rate (number of times a user requests the same information during a time period), and the like.

The concept map 130 can be characterized by different types of information and associated features. For each node in the concept map 130, a path to high level categories can be constructed. According to one embodiment of the present invention, for each node the page rank, may be calculated and for each node the system calculates a path where a next step of the path is the highest page rank node among first neighbors of the current node. This path is called a categorization path.

Figure 1C:
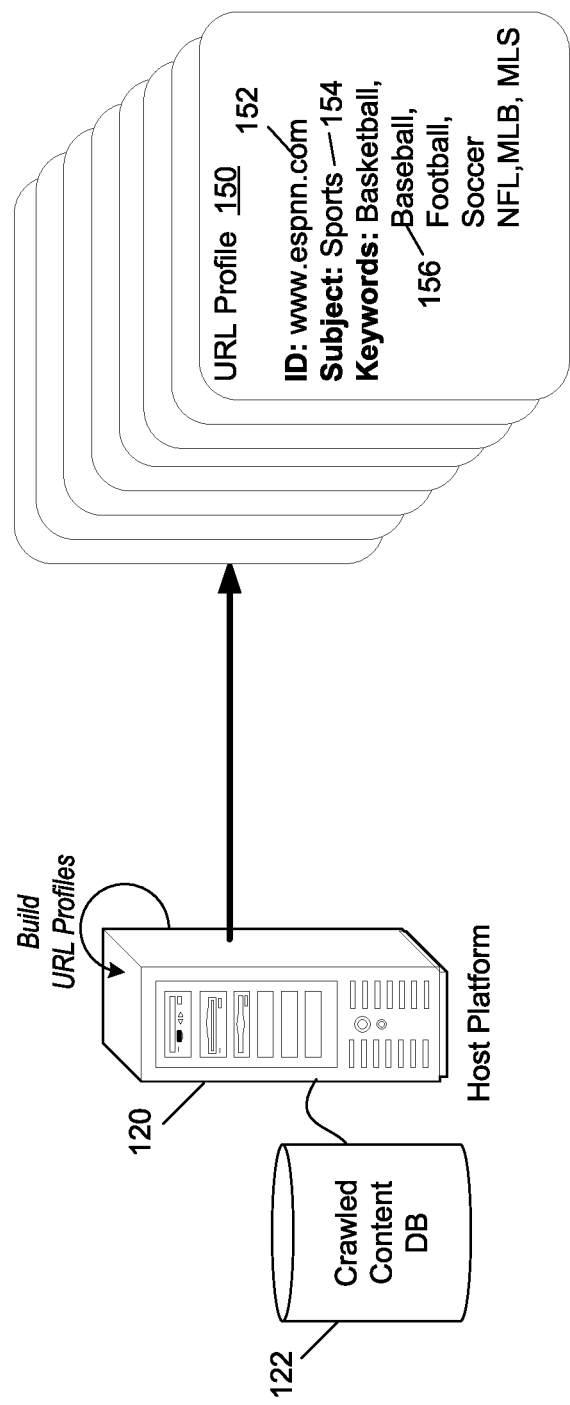
FIG. 1C is diagram illustrating a process of building a URL profile for use with the concept map according to an example embodiment.

FIG. 1C illustrates a process 160 of building a profile for a URL for use with the concept map 130 according to an example embodiment. The profile may be referred to herein as a URL profile and may include or otherwise replace a traditional cookie profile of a user. That is, instead of the concept map using a user profile (which is identified using a cookies ID of the user and which includes tracked historical content accessed by the user, the example embodiments can rely on a URL profile. The URL profile does not require tracked user history on the web nor a cookies ID. Instead, any unique identifier associated with a URL can be used to identify and build a profile that can be used for mapping to target ad profiles via the concept map.

Referring to FIG. 1C, the host platform 120 may access the URL content DB 122 with crawled content from the web and generate profiles for each crawled URL. For example, the host platform may generate a URL profile 150 for each crawled URL which includes attributes of the URL such as an identifier of the URL 152, a subject matter 154 (or multiple subject matters) of the content on the page, one or more keywords 156 on the page, and the like, which can be obtained by the host platform 120 when performing the crawl process described in FIG. 1A. The host platform 120 may perform the profiling process 160 at the same time that the host platform 120 performs the web crawling process, or the two process may be performed at separate times. It should also be appreciated that the host platform does not need to be a crawl server, but instead may use crawled content from another system.

In addition, the host platform may use artificial intelligence models to identify other concepts not on the page of the URL but that are related/relevant to the URL. For example, a URL of an e-commerce website that sells paint may include a concept of "home improvement" within its URL profile even though the term is not found on the page. Rather, the content from the page can be analyzed by an artificial intelligence model that identifies other terms and concepts that are related to the content.

Figure 1D:
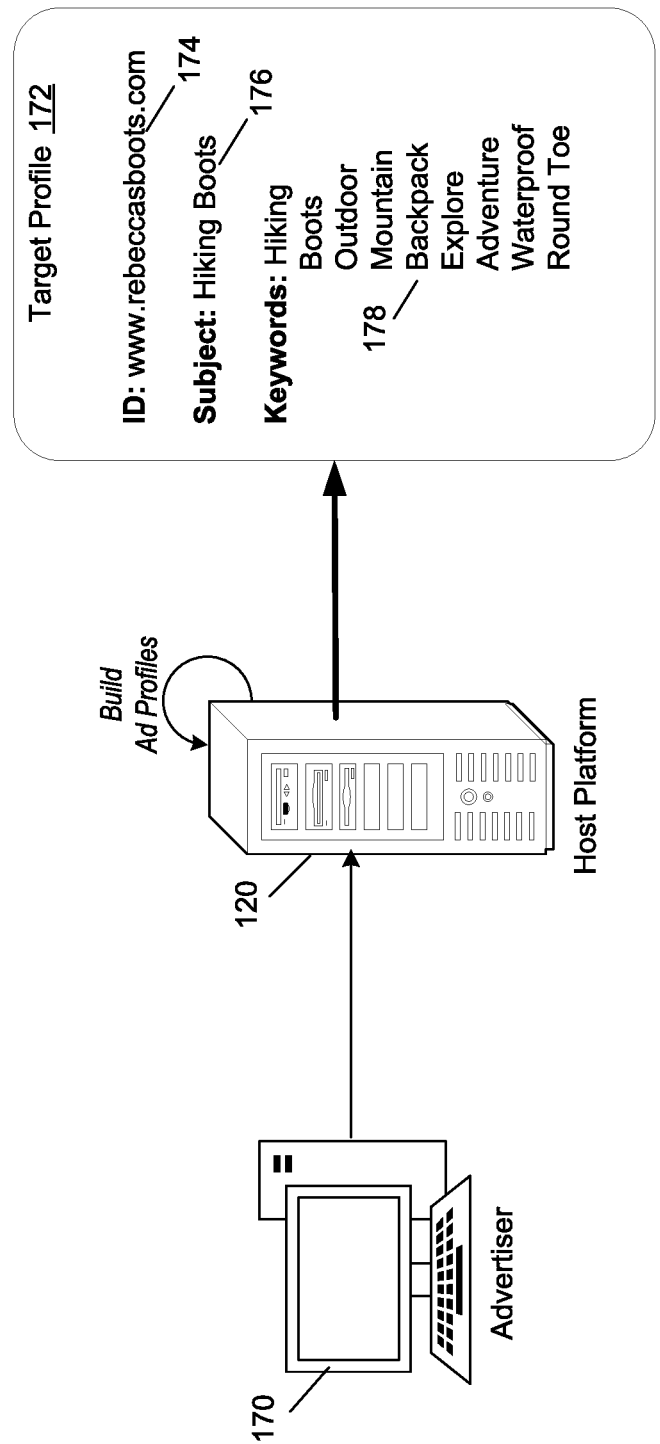
FIG. 1D is a diagram illustrating a process of building a target profile for use with the concept map according to an example embodiment.

FIG. 1D illustrates a process 180 of building a target profile 172 such as an advertising profile for use with the concept map 130 according to an example embodiment. Referring to FIG. 1D, the host platform 180 may provide a user interface or other web-based interface for an advertiser 170 to create a target profile 172. The target profile 172 may include attributes and other information about desired targets of the advertisements. The attributes and other information may include an identifier 174, a subject matter 176, one or more keywords 178, and the like, which can be used by the concept map 130. The attributes and other information may be input to the host platform 120 via the user interface. As another example, the target profiles may be provided in completed form from the advertisers.

FIG. 2A illustrates a process 200 of listening for bid requests at an auction house 220 according to an example embodiment. Referring to FIG. 2A, a host platform 230 may "sit" on an auction house 220 and listen for bid requests as they are sent to the auction house 220 from website hosts/publishers, including web server 210. For example, when a user visits a web page hosted by the web server 210 via a user device 202, and the web page includes ad units on it, the web server 210 may generate a bid request 212 based on a combination of attributes of the page being visited and the user. For example, the bid request 212 may include an identifier of the web page (e.g., HTTP header, a URL, a Floc ID, etc.), user demographics, browsing history, geographic location data, an IP address of the user, a cookie ID of the user, ad restrictions, a website identifier of the page, and the like. The bid request 212 is sent from the web server 210 to the auction house 220 (also referred to as an ad exchange).

The host platform 230 may listen to the bid request 212 via an application programming interface (API) 222, or the like, of the auction house 220 and perform real-time bidding on the bid request 212 via the auction house 220. In some embodiments, filtered bid requests may be sent based on configuration data submitted by the host platform 230 to the auction house 220. In response to receiving a bid request the host platform may bid on the bid request. Should the host platform 230 win the bidding process, the host platform may send web content (e.g., advertising content) for display within the web page accessed by the user via the web server 210.

Figure 2B:
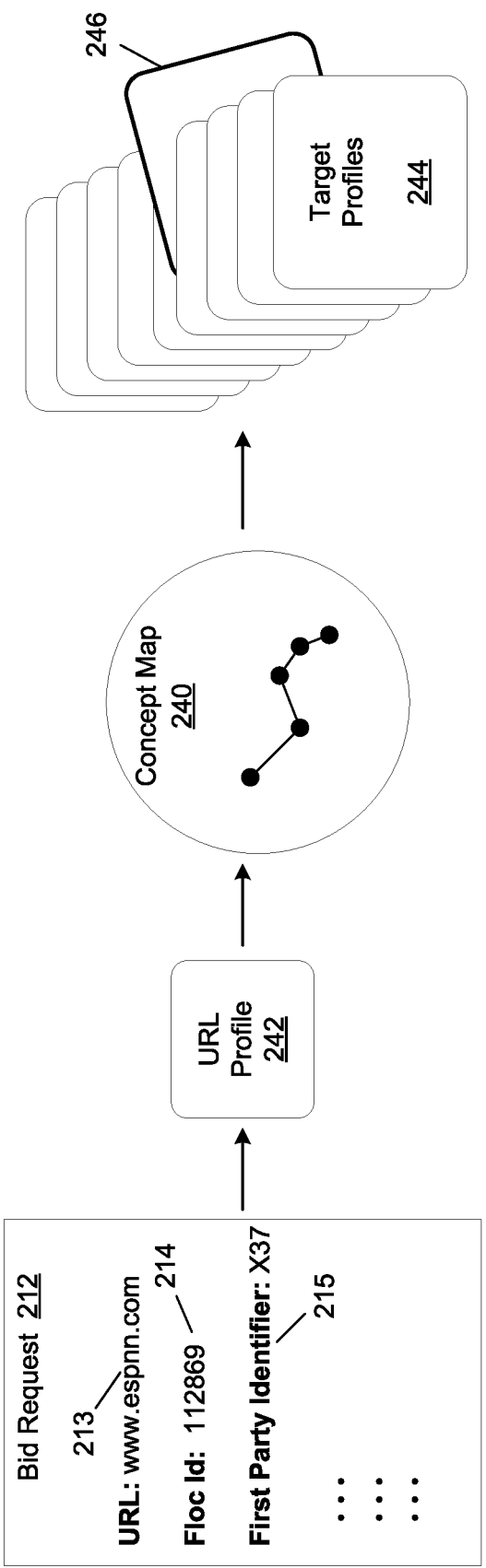
FIG. 2B is a diagram illustrating a process of translating the bid request into a target profile according to an example embodiment.

FIG. 2B illustrates a process 250 of translating the bid request 212 to a target profile 246 among a plurality of target profiles 244, according to an example embodiment. According to various embodiments, a concept map 240 as described herein and in related patent applications incorporated herein, can be used to map the bid request 212 to the target profile 246 by mapping the bid request 212 to a URL profile 242. For example, the host platform may identify a previously-generated URL profile 242 of the URL 213 that was generated during a crawl process or based on crawled content from the URL 213.

Next, the host platform may map the URL profile 242 to the target profile 246 via the concept map 240. The URL profile 242 may include keywords, subject matter data, and the like, that can be used to identify a starting point/concept in the concept map 240. Furthermore, the concept map may map to another node or nodes that are targeted by the target profile 246. Although the URL 213 is used in this example, other attributes/identifiers from the bid request 212 may be used instead of the URL 213. For example, first party identifiers such as identifiers of website publishers and universal identifiers may have profiles designed for them and used instead of the URL profiles. The first party identifier profiles may have the same content as the URL profiles. As another example, Floc IDs could have profiles built in a similar way and used to map to target profiles.

Figure 2C:
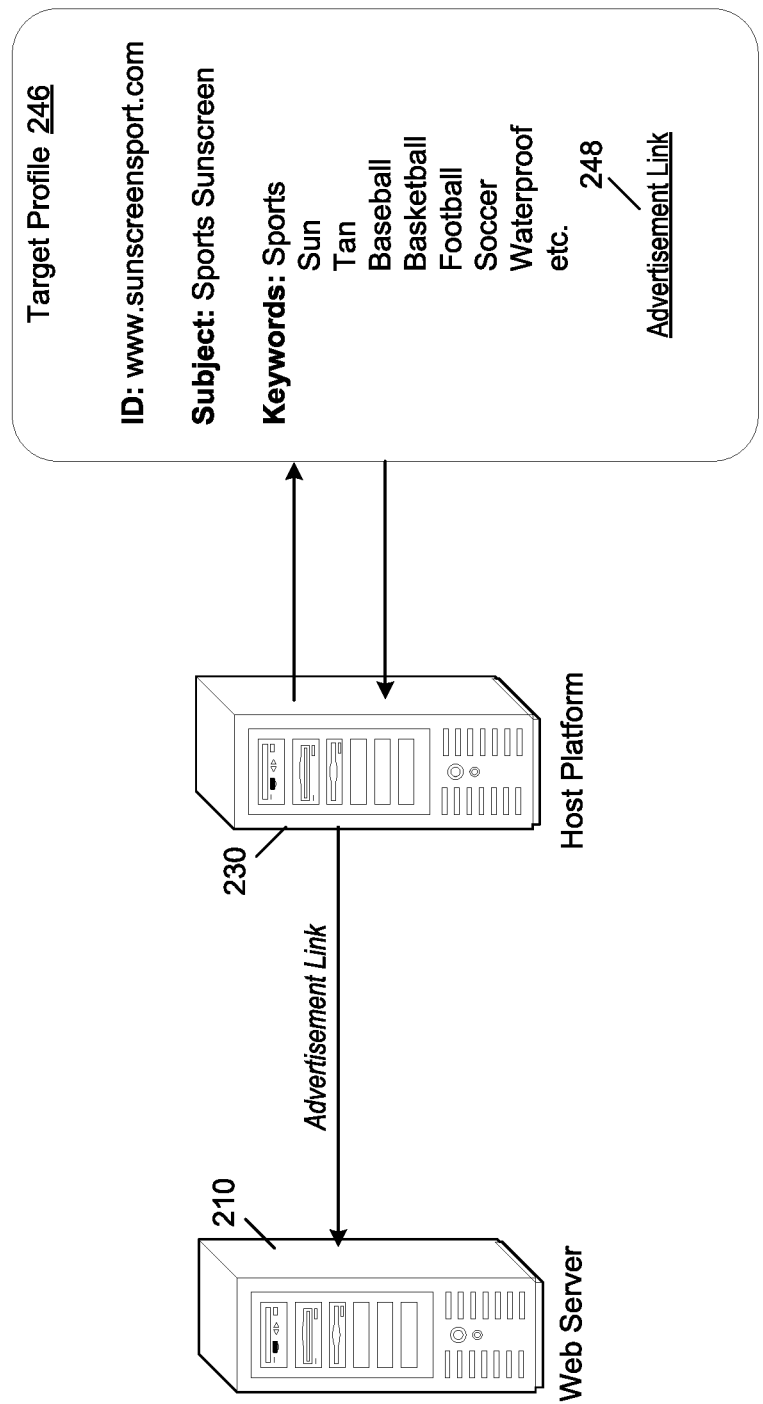
FIG. 2C is a diagram illustrating a process of submitting target content from the target profile to a user device according to an example embodiment.

FIG. 2C illustrates a process 260 of submitting target content from the target profile to a user device according to an example embodiment. Referring to FIG. 2C, in this example, the host platform 230 has selected the target profile 246 for purposes of displaying an advertisement on a web browser of the user device 202 shown in FIG. 2A. Here, the host platform may identify an advertisement content 248 (e.g., link, image, text, audio, video, etc.) associated with the target profile 246 based on the target profile 246 and transmit the advertisement content 248 to the web server 210 hosting the page being accessed by the user device 202. Thus, the web server can instantiate the advertising content 248 into the user's browser via a page refresh.

FIG. 3 illustrates a method 300 of translating a bid request into a target profile based on a URL profile according to an example embodiment. For example, the method 300 may be performed by a computer system such as a cloud platform, a web server, a personal computer or other user device, and the like. Referring to FIG. 3, in 310 the method may include storing, via a storage device, target profiles comprising respective target content. The target profiles may be generated based on user interface inputs to a host software platform such as a web server, a cloud platform, or the like. The target profiles may include links, images, pointers, and the like, to viewing content such as ads, etc. The target profiles may also include keywords, a subject matter, and the like, that are set by developers of the target profiles.

In 320, the method may include receiving, via a network interface, a request comprising a uniform resource locator (URL) of web content being viewed on a user device. In 330, the method may include identifying, via a processor, a URL profile corresponding to the URL, wherein the URL profile comprises concepts associated with the web content. In 340, the method may include mapping, via the processor, the concepts included in the identified URL profile to a target profile among the stored target profiles via a concept map. In 350, the method may include transmitting, via the network interface, viewing content associated with the target profile to the user device in response to the received request.

In some embodiments, the method may further include crawling a plurality of servers for a plurality of pages of content prior to receipt of the request, building a plurality of URL profiles corresponding to the plurality of pages of content based on keywords stored on the plurality of pages of content, and the storing the plurality of URL profiles in the storage device. In some embodiments, the identifying may include selecting the identified URL profile from among the plurality of URL profiles corresponding to the plurality of pages from the plurality of servers.

In some embodiments, the receiving may include receiving a bid request of the user device via an auction house, and the method further comprises submitting a bid for the bid request via the auction house. In some embodiments, the transmitting may include transmitting an image comprising viewing content from the target profile to the user device in response to receipt of a notification of acceptance of the bid from the auction house. In some embodiments, the URL profile may include a plurality of keywords from a page of content at a corresponding URL, and the concept graph is configured to map the plurality of keywords to one or more target profiles based on keywords included in the one or more target profiles. In some embodiments, the mapping may include mapping the concepts included in the identified URL profile to a target profile based on a subset of nodes in the concept map that are mapped to the target profile.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example computer system architecture 400, which may represent or be integrated in any of the above-described components, etc.

FIG. 4 illustrates an example system 400 that supports one or more of the example embodiments described and/or depicted herein. The system 400 comprises a computer system/server 402, which is operational with numerous other general purpose or special purpose computing system environments or configurations. Examples of well-known computing systems, environments, and/or configurations that may be suitable for use with computer system/server 402 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 402 in cloud computing node 400 is shown in the form of a general-purpose computing device. The components of computer system/server 402 may include, but are not limited to, one or more processors or processing units 404, a system memory 406, and a bus that couples various system components including system memory 406 to processor 404.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media. System memory 406, in one embodiment, implements the flow diagrams of the other figures. The system memory 406 can include computer system readable media in the form of volatile memory, such as random-access memory (RAM) 410 and/or cache memory 412. Computer system/server 402 may further include other removable/non-removable, volatile/non-volatile computer system storage media. By way of example only, storage system 414 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 406 may include at least one program product having a set (e.g., at least one) of program modules that are configured to carry out the functions of various embodiments of the application.

Program/utility 416, having a set (at least one) of program modules 418, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. Program modules 418 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 402 may also communicate with one or more external devices 420 such as a keyboard, a pointing device, a display 422, etc.; one or more devices that enable a user to interact with computer system/server 402; and/or any devices (e.g., network card, modem, etc.) that enable computer system/server 402 to communicate with one or more other computing devices. Such communication can occur via I/O interfaces 424. Still yet, computer system/server 402 can communicate with one or more networks such as a local area network (LAN), a general wide area network (WAN), and/or a public network (e.g., the Internet) via network adapter 426. As depicted, network adapter 426 communicates with the other components of computer system/server 402 via a bus. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:
1. An apparatus comprising:
    a storage configured to store target profiles comprising respective target content; and
    a processor configured to:

execute a bidding process based on requests received via an application programming interface (API) of an auction house;

receive a bid request from the auction house based on the bidding process, the bid request comprising an identifier of a web page being viewed on a user device;

identify a profile that is previously generated prior to the bidding process and which corresponds to the identifier of the web page included in the bid request, wherein the profile comprises concepts previously extracted from web content of the web page being viewed on the user device;

map the concepts included in the identified profile to a target profile among the stored target profiles based on a subset of nodes in a concept map that are mapped to the target profile, wherein the concept map is a model which includes a plurality of concept nodes and relationships defined between the concept nodes; and display digital content associated with the target profile within the web page being viewed on the user device in response to the bid request.

2. The apparatus of claim 1, wherein the processor is further configured to crawl a plurality of servers for a plurality of pages of content prior to the bidding process, build a plurality of profiles corresponding to a plurality of pages of content based on keywords stored on the plurality of pages of content, and identify the profile from the plurality of profiles for the plurality of pages.

3. The apparatus of claim 1, wherein the processor is further configured to execute an artificial intelligence (AI) model on the concepts included in the profile to identify an additional concept not on the web page, wherein the processor further maps the identified profile to the target profile based on the additional concept.

4. The apparatus of claim 1, wherein the processor is configured to bid on the bid request via the auction house.

5. The apparatus of claim 4, wherein the processor is further configured to transmit an image comprising digital content from the target profile within the web page currently being viewed on the user device in response to receipt of a notification of acceptance of the bid from the auction house.

6. The apparatus of claim 1, wherein the identifier comprises a uniform resource locator (URL) of the web page being viewed on the user device.

7. A method comprising:
storing, via a storage device, target profiles comprising respective target content;

executing a bidding process based on requests received via an application programming interface (API) of an auction house;

receiving a bid request from the auction house based on the bidding process, the bid request comprising an identifier of a web page being viewed on a user device;

identifying, via a processor, a profile that is previously generated prior to the bidding process and which corresponds to the identifier of the web page included in the bid request, wherein the profile comprises concepts previously extracted from web content of the web page being viewed on the user device;

mapping, via the processor, the concepts included in the identified profile to a target profile among the stored target profiles based on a subset of nodes in a concept map that are mapped to the target profile, wherein the concept map is a model including a plurality of concept nodes and relationships defined between the concept nodes; and displaying digital content associated with the target profile within the web page being viewed on the user device in response to the bid request.

8. The method of claim 7, wherein the method further comprises crawling a plurality of servers for a plurality of pages of content prior to the bidding process, building a plurality of profiles corresponding to a plurality of pages of content based on keywords stored on the plurality of pages of content, and identifying the profile from the plurality of profiles for the plurality of pages.

9. The method of claim 7, wherein the method further comprises executing an artificial intelligence (AI) model on the concepts included in the profile to identify an additional concept not on the web page, wherein the mapping further comprises mapping the identified profile to the target profile based on the additional concept.

10. The method of claim 7, wherein the method further comprises submitting a bid for the bid request via the auction house.

11. The method of claim 10, wherein the transmitting comprises transmitting an image comprising digital content from the target profile to the content slot within the web page currently being viewed on the user device in response to receipt of a notification of acceptance of the bid from the auction house.

12. The method of claim 7, wherein identifier comprises a uniform resource locator (URL) of the web page being viewed on the user device.

13. A non-transitory computer-readable storage medium comprising instructions, that when read by a processor, cause the processor to perform:
storing target profiles comprising respective target content;

executing a bidding process based on requests received via an application programming interface (API) of an auction house;

receiving a bid request from the auction house based on the bidding process, the bid request comprising an identifier of a web page being viewed on a user device;

identifying a profile that is previously generated prior to the bidding process and which corresponds to the identifier of the web page included in the bid request, wherein the profile comprises concepts previously extracted from web content of the web page being viewed on the user device;

mapping the concepts included in the identified profile to a target profile among the stored target profiles based on a subset of nodes in a concept map that are mapped to the target profile, wherein the concept map is a model which includes a plurality of concept nodes and relationships defined between the concept nodes; and displaying digital content associated with the target profile within the web page being viewed on the user device in response to the bid request.

14. The computer-readable storage medium of claim 13, wherein the processor is further configured to perform crawling a plurality of servers for a plurality of pages of content prior to the bidding process, building a plurality of profiles corresponding to a plurality of pages of content based on keywords stored on the plurality of pages of content, and identifying the profile from among the plurality of profiles in the storage device for the plurality of pages.

15. The computer-readable storage medium of claim 14, wherein the processor is further configured to perform executing an artificial intelligence (AI) model on the concepts included in the profile to identify an additional concept not on the web page, wherein the processor further maps the identified profile to the target profile based on the additional concept.

16. The computer-readable storage medium of claim 13, wherein the processor is further configured to perform submitting a bid for the bid request via the auction house.

17. The computer-readable storage medium of claim 16, wherein the transmitting comprises transmitting an image comprising digital content from the target profile to the user device in response to receipt of a notification of acceptance of the bid from the auction house.

* * * * *